United States Patent
Hosabettu

(10) Patent No.: US 10,331,759 B2
(45) Date of Patent: Jun. 25, 2019

(54) METHODS AND SYSTEM FOR CONTROLLING USER ACCESS TO INFORMATION IN ENTERPRISE NETWORKS

(71) Applicant: Wipro Limited, Bangalore (IN)

(72) Inventor: Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 201 days.

(21) Appl. No.: 15/431,849

(22) Filed: Feb. 14, 2017

(65) Prior Publication Data

US 2018/0189413 A1    Jul. 5, 2018

(30) Foreign Application Priority Data

Dec. 29, 2016   (IN) .............................. 201641044921

(51) Int. Cl.
  *G06F 16/00*    (2019.01)
  *G06F 16/958*   (2019.01)
  (Continued)

(52) U.S. Cl.
  CPC ........ *G06F 16/972* (2019.01); *G06F 16/3329* (2019.01); *G06F 16/367* (2019.01);
  (Continued)

(58) Field of Classification Search
  CPC ......... G06F 17/30893; G06F 17/30654; G06F 17/30734; G06F 21/604; G06F 21/6218;
  (Continued)

(56) References Cited

U.S. PATENT DOCUMENTS 8,442,940 B1 *   5/2013  Faletti ................. G06F 17/2785
                                                   707/610
2005/0267871 A1 * 12/2005  Marchisio ........... G06F 16/3338
                        (Continued)

OTHER PUBLICATIONS

Masoud Narouei et al., "Automatic Top-Down Role Engineering Framework Using Natural Language Processing Techniques", *IFIP*, Oct. 24, 2015, pp. 137-152.
(Continued)

*Primary Examiner* — Noosha Arjomandi
(74) *Attorney, Agent, or Firm* — Finnegan, Henderson, Farabow, Garrett & Dunner, LLP

(57) ABSTRACT

This disclosure relates to providing information access in an enterprise network. The method includes creating automatically an ontology by analyzing at least one document comprising semantic information for roles, responsibilities, authority, and restrictions associated with a plurality of users; extracting based on the ontology a plurality of contextual terms associated with at least one of roles, responsibilities, authority, or restrictions; assigning a plurality of annotation tags to each sentence in at least one enterprise policy document based on the plurality of contextual terms; generating a plurality of information access rules based on the plurality of contextual terms and assigned plurality of annotation tags to each sentence in the at least one enterprise policy document; and creating a context similarity tree based on the assigned plurality of annotation tags and the plurality of information access rules.

17 Claims, 5 Drawing Sheets

(51) Int. Cl.
*G06F 16/36* (2019.01)
*G06F 16/332* (2019.01)
*G06F 21/62* (2013.01)
*G06F 21/60* (2013.01)
*G06F 16/28* (2019.01)

(52) U.S. Cl.
CPC ........ *G06F 21/604* (2013.01); *G06F 21/6218* (2013.01); *G06F 21/6227* (2013.01); *G06F 16/288* (2019.01)

(58) Field of Classification Search
CPC ........... G06F 21/6227; G06F 17/30604; G06F 17/2785; G06F 16/972; G06F 16/367; G06F 16/3329; G06F 16/288
See application file for complete search history.

(56) References Cited

U.S. PATENT DOCUMENTS

| | | | | |
|---|---|---|---|---|
| 2009/0070322 A1* | 3/2009 | Salvetti | ............... | G06F 16/3334 |
| 2011/0246441 A1 | 10/2011 | Kolz et al. | | |
| 2012/0259895 A1* | 10/2012 | Neely, III | ......... | G06F 17/30734 |
| | | | | 707/798 |
| 2014/0236579 A1* | 8/2014 | Kurz | ....................... | G06F 17/28 |
| | | | | 704/9 |
| 2015/0081711 A1* | 3/2015 | Harris | ............... | G06F 16/24522 |
| | | | | 707/737 |
| 2016/0042273 A1* | 2/2016 | Brunet | ................. | G06Q 30/016 |
| | | | | 706/11 |
| 2016/0188570 A1* | 6/2016 | Lobez Comeras | ... | G06F 16/367 |
| | | | | 704/9 |
| 2016/0224541 A1* | 8/2016 | Yakovlev | .............. | G06F 16/367 |
| 2017/0017635 A1* | 1/2017 | Leliwa | .................. | G06F 17/271 |
| 2017/0329760 A1* | 11/2017 | Rachevsky | ........... | G06F 17/271 |

OTHER PUBLICATIONS

Xusheng Xiao et al., "Automated Extraction of Security Poilcies from Natural-Language Software Documents", *Proceedings of the ACM SIGSOFT 20th International Symposium on the Foundations of Software Engineering. FSE '12*, Jan. 1, 2012, 1-11 pages.

John Slankas, Implementing Database Access Control Policy from Unconstrained Natural Language Text, *IEEE*, May 18, 2013, pp. 1357-1360.

Extended European Search Report from the European Patent Office in counterpart European Application No. 17161467.0 dated Jun. 9, 2017, 13 pages.

T. Finin et al., "ROWLBAC—Representing Role Based Access Control in OWL", *SACMAT'08*, Jun. 11-13, 2008, pp. 73-82.

Torsten Priebe et al., Supporting Attribute-based Access Control in Authorization and Authentication Infrastructures with Ontologies, *Proceedings of the First International Conference on Availability, Reliability and Security (ARES 2006)*, Apr. 2006, 1-12 pages.

Carsten Keßler, "Context-Aware Semantics-Based Information Retrieval", May 2010, 128 pages.

* cited by examiner

METHODS AND SYSTEM FOR CONTROLLING USER ACCESS TO INFORMATION IN ENTERPRISE NETWORKS

TECHNICAL FIELD

This disclosure relates generally to information access in enterprise networks and more particularly to methods and system for controlling user access to information in enterprise networks.

BACKGROUND

Protection and authentication of digital content has become a significant issue in the current digital epoch with efficient communication mediums such as the Internet used for information retrieval. Currently available techniques for content description and query processing in information retrieval are based on keywords. The techniques thus provide limited capabilities to capture the conceptualizations associated with user needs and contents.

The structure of the semantic web gives users the power to share and collaboratively generate decentralized linked data. In many cases though, collaboration requires some form of authentication and authorization to ensure the security and integrity of the data being generated. Conventional authorization systems, for example, role-based authentication, attribute-based authentication, and ontology-based authentication rely on centralized databases and are thus insufficient.

Moreover, these existing solutions are manual and there are no dynamic changes in these solutions in order to provide access based on context. These existing solutions only allow for the specific constraints of static and dynamic separation of duties and there is no room for any additional constraints.

SUMMARY

In one embodiment, a method of providing information access in an enterprise network is disclosed. The method includes creating automatically, by an enterprise network device, an ontology by analyzing at least one document comprising semantic information for roles, responsibilities, authority, and restrictions associated with a plurality of users; extracting based on the ontology, by the enterprise network device, a plurality of contextual terms associated with at least one of roles, responsibilities, authority, or restrictions; assigning, by the enterprise network device, a plurality of annotation tags to each sentence in at least one enterprise policy document based on the plurality of contextual terms, wherein each of the plurality of annotation tags corresponding to at least one of roles, responsibilities, authority, and restrictions; generating, by the enterprise network device, a plurality of information access rules based on the plurality of contextual terms and assigned plurality of annotation tags to each sentence in the at least one enterprise policy document; and creating, by the enterprise network device, a context similarity tree based on the assigned plurality of annotation tags and the plurality of information access rules.

In another embodiment, an enterprise network device for providing information access in an enterprise network is disclosed. The enterprise network device includes a processor; and a memory communicatively coupled to the processor, wherein the memory stores processor instructions, which, on execution, causes the processor to create automatically an ontology by analyzing at least one document comprising semantic information for roles, responsibilities, authority, and restrictions associated with a plurality of users; extract based on the ontology a plurality of contextual terms associated with at least one of roles, responsibilities, authority, or restrictions; assign a plurality of annotation tags to each sentence in at least one enterprise policy document based on the plurality of contextual terms, wherein each of the plurality of annotation tags corresponding to at least one of roles, responsibilities, authority, and restrictions; generate a plurality of information access rules based on the plurality of contextual terms and assigned, plurality of annotation tags to each sentence in the at least one enterprise policy document; and create a context similarity tree based on the assigned plurality of annotation tags and the plurality of information access rules.

In yet another embodiment, a non-transitory computer-readable storage medium having is disclosed. The non-transitory computer-readable storage medium has instructions stored thereon, a set of computer-executable instructions for providing information access in an enterprise network, causing a computer comprising one or more processors to perform steps comprising: creating automatically, by an enterprise network device, an ontology by analyzing at least one document comprising semantic information for roles, responsibilities, authority, and restrictions associated with a plurality of users; extracting based on the ontology, by the enterprise network device, a plurality of contextual terms associated with at least one of roles, responsibilities, authority, or restrictions; assigning, by the enterprise network device, a plurality of annotation tags to each sentence in at least one enterprise policy document based on the plurality of contextual terms, wherein each of the plurality of annotation tags corresponding to at least one of roles, responsibilities, authority, and restrictions; generating, by the enterprise network device, a plurality of information access rules based on the plurality of contextual terms and assigned plurality of annotation tags to each sentence in the at least one enterprise policy document; and creating, by the enterprise network device, a context similarity tree based on the assigned plurality of annotation tags and the plurality of information access rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
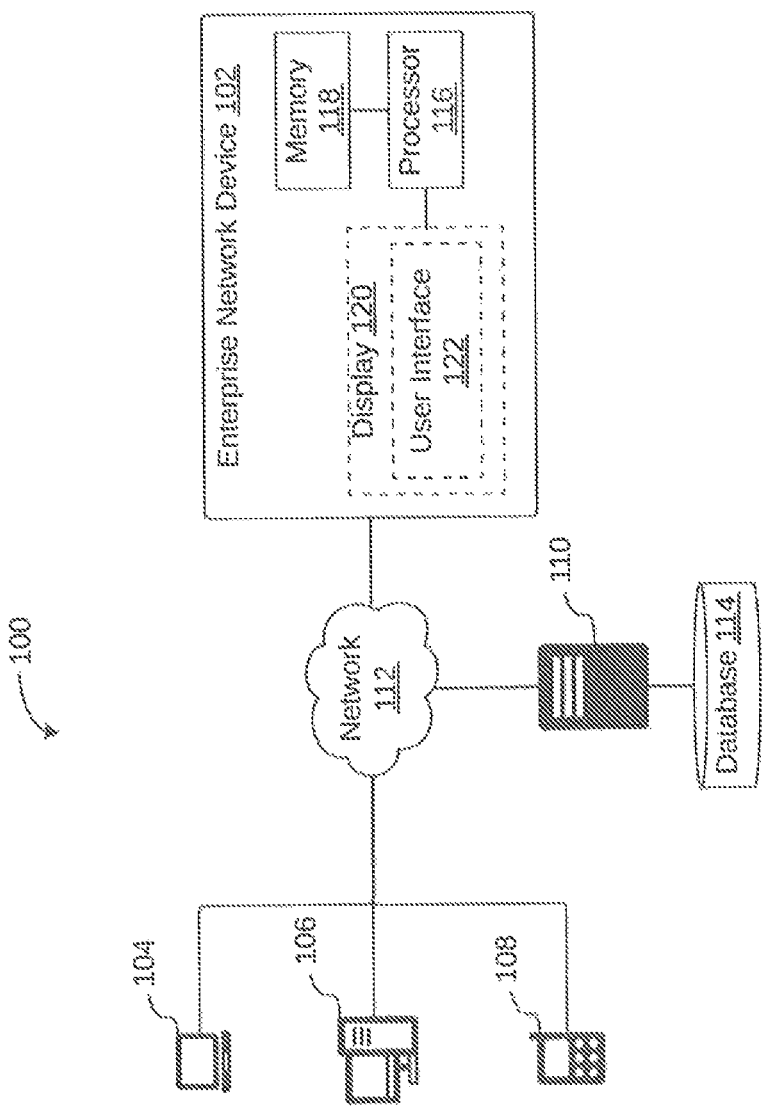
FIG. 1 illustrates an enterprise network (that is exemplary) in which various embodiments may function.

Additional illustrative embodiments are listed below. In one embodiment, an enterprise network 100 (that is exemplary) in which various embodiments may function is illustrated in FIG. 1. Enterprise network 100 includes an enterprise network device 102 that communicates with a plurality of external devices (for example, a laptop 104, a desktop 106, a mobile device 108, and a server 110) via network 112. Other examples of external devices may include, but are not limited to a tablet, a phablet, an application server, a router, switches, a gateway, a bridge, a modem, a HUB, and a Multistation Access Unit (MAU). Network 110 may be a wireless or a wireline network.

Enterprise network device 102 may be used by one or more users to access enterprise information stored in a database 114. Enterprise information may include, but is not limited to employee information, client data, financial information, Human Resource documents. There may be access restrictions for enterprise information based on a role associated with a user of enterprise network device 102. By way of an example, only managers may have access to client data and other financial information. By way of another example, the type of HR documents that can be accessed by a user may depend on designation of that user in the enterprise. However, as the enterprise information stored in database 114 is not constant and keeps on changing based on requirements of the enterprise and as access policies or rules for accessing enterprise information keeps on evolving and changing, a continuously and dynamically evolving access authentication model is required.

To this end, enterprise network device 102 includes a processor 116 that is communicatively coupled to a memory 116. Memory 118 further includes various modules that enable enterprise network device 102 to create a context similarity tree to determine user access to information in enterprise network 100 (enterprise information) and to provide information access to a user. This is explained in detail in conjunction with FIG. 2. Enterprise network device 102 may further include a display 120 having a User Interface (UI) 122 that may be used by a user to enter details regarding enterprise information required by the user. Display 120 may further be used to display whether access permission is granted to the user or not. Additionally, subsequent to the user being granted permission to access, display 120 may be used to display the relevant enterprise information.

Figure 2:
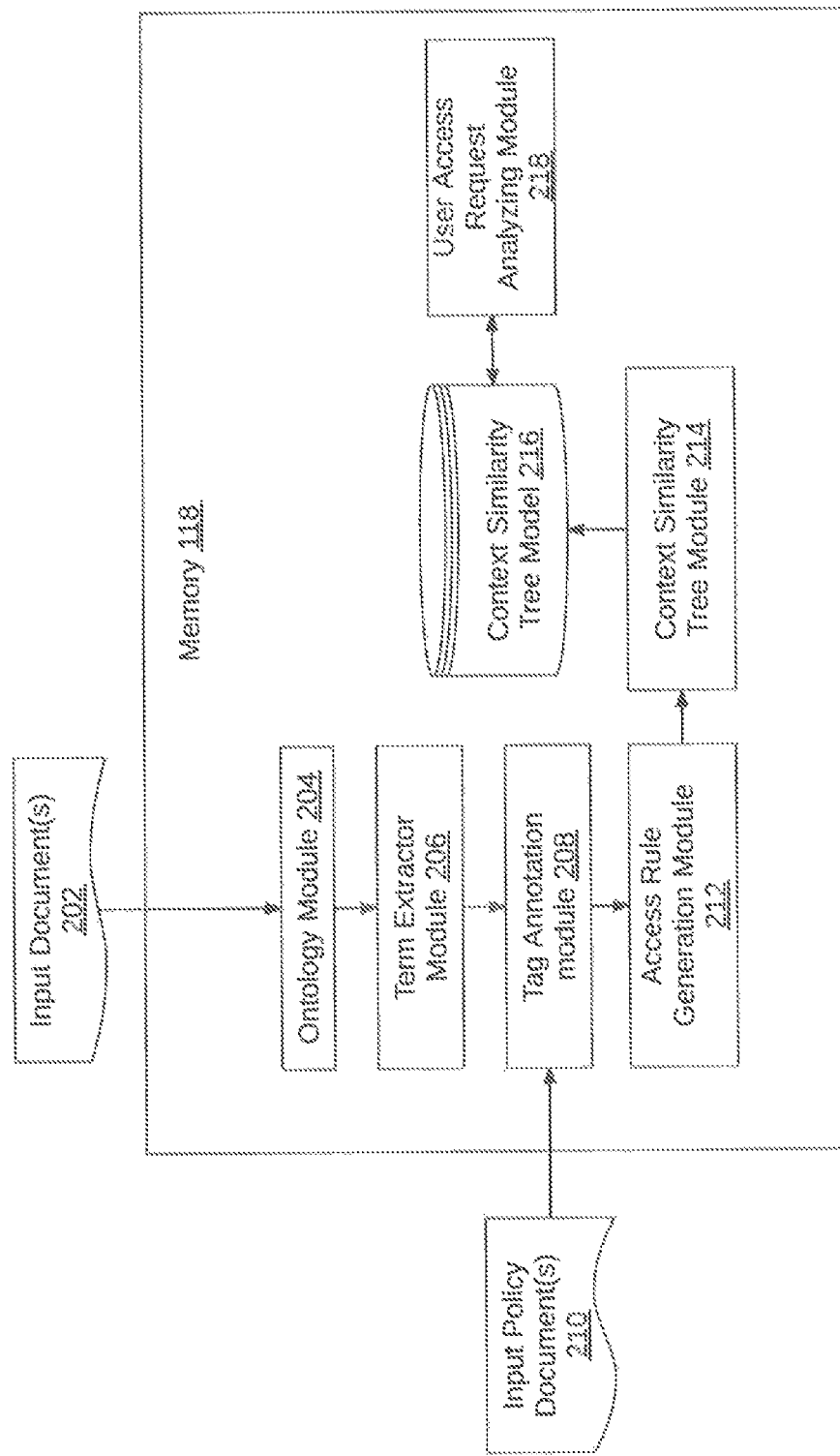
FIG. 2 is a block diagram illustrating various modules in a memory of an enterprise network device in an enterprise network, in accordance with an embodiment.

Referring now to FIG. 2, a block diagram illustrating various modules stored in memory 118 of enterprise network device 102 in an enterprise network, in accordance with an embodiment. In order to create a context similarity tree that may be used to determine user access to enterprise information within the enterprise network, input documents 202 are first processed by enterprise network device 102. Input documents 202 are received by an ontology module 204 from a user via UI 122, an application (for example, Adobe Acrobat, BOTs, MS Word, Internet Explorer, etc.), or an external device (for example, a scanner, a fax machine, or a computing device, etc.). It will be apparent to a person skilled in the art that input documents 202 may be text documents, images, or web pages from which the data may be extracted so as to create an ontology. In an enterprise, every job role or level may have a predefined role, responsibility, authority, and restrictions associated with it. Thus, when a role based ontology is required to be created, input documents 202, for example, would include job descriptor documents and security policy documents that have semantic information associated with job descriptions for different roles or employee levels within the enterprise. These documents would thus include detailed information for roles and its responsibilities, authorities, and restrictions associated with a plurality of users in the enterprise.

Ontology module 204 creates an ontology by analyzing these input documents and by extracting the semantic information from them. Restrictions associated with a role may be based on time, geography, and personal information. By way of an example, a user may be restricted to perform an assigned task for stipulated period of time, specifically, on some daysidates. By way of another example, a user may be restricted to perform assigned task in certain regions of the world, for example, APAC, Europe or USA. Additionally, restrictions associated with a role may also be based on role dynamicity, which means different roles played by the same person having two different time or geographies or personal information. By way of an example, a portion of such an ontology created by ontology module 204 based on input documents 204 is illustrated in table 1 given below:

TABLE 1

| | |
|---|---|
| Role | HR Manager |
| Responsibility | Appraisals process for employees |
| | Completion of all appraisals on time |
| Authentication | HR Can review the appraisal comments and status |
| Restriction | Can view appraisals all employees with band below a predefined band |
| | Can view appraisals all employees within same group as HR |

Thereafter, based on the ontology, a term extractor module 206 extracts a plurality of contextual terms associated with one or more of roles, responsibilities, authority, or restrictions. These contextual terms after being extracted, may be normalized. However, two contextual terms may co-occur for various reasons, including functional and other relationships.

A separate list of unique terms for each of role, responsibility, authority, and restrictions are identified from the ontology and are thereafter classified. In an embodiment, different properties or classes may be defined for these unique terms. Once the plurality of contextual terms have been extracted from the ontology, relationship amongst these plurality of contextual terms may be determined. In an embodiment, contextual terms that are dependent on other contextual terms or are completely independent of other contextual terms are determined. By way of an example, if we consider "Java Developer," "Java" depends on "Developer," and is thus a dependent contextual term, while "Developer" does not depend on "Java," and is thus an independent contextual term.

Each of the plurality of contextual terms may further be categorized into a plurality of categories. These categories may include, but are not limited to mandatory contextual terms, optional contextual terms, conditional contextual terms, value based contextual terms, or discrete terms. By way of an example, if a term "Experience of 3 years" is represented in the ontology, then "Experience" would be categorized as a value based contextual term.

The plurality of contextual terms are fed into a tag annotation module 208. In addition to these contextual terms, tag annotation module 208 also receives input policy documents 210 from a user via UI 122, an application (for example, Adobe Acrobat, BOTs, MS Word, Internet Explorer, etc.), or an external device (for example, a scanner, a fax machine, or a computing device, etc.). It will be apparent to a person skilled in the art that input policy documents 210 may be text documents, images, or web pages from which the data may be extracted. Input policy documents 210 are enterprise policy documents, and examples of these documents may include, but are not limited to appraisal process document, a recruitment process document, and a general security process document. By way of an example, enterprise policy documents and their relevant information is illustrated in table 2 given below:

TABLE 2

| Enterprise Policy Document | Relevant Policy Information |
| --- | --- |
| Appraisal process | Employees have to complete the self-appraisal by the specified date and time. |
| | HR will look through the appraisal status of all employees. |
| | HR will enforce the employees to complete/close appraisals on time |
| Recruitment process | Employees referring a candidate will not participate in the interview process |
| | The last round of interview has to be taken by an HR manager |
| | A candidate being recruited at manager level should have at least 5 years of experience |
| GeneralSecurityPolicy | No soliciting and tailgating is allowed |
| | All employees need to carry Lanyards with valid employee identification cards |
| | Employees are not allowed to carry storage device that are not issued by the company in the company premises |

As the enterprise policy documents include natural language sentences, these sentences are first parsed using natural language processing engine. Thereafter, enterprise policy information is extracted from these enterprise policy documents and the plurality of annotation tags are assigned using the plurality of contextual terms. Each of the plurality of annotation tags correspond to one or more of roles, responsibilities, authority, and restrictions. In other words, there may be four annotation tags, i.e., "role annotation tag," "responsibility annotation tag," "authority annotation tag," and "restriction annotation tag," While assigning these annotation tags, a lemmatized version of each of the plurality of contextual terms is matched with words in each sentence of the enterprise policy documents.

For each sentence in the enterprise policy documents, tag annotation module 208 uses the plurality of contextual terms extracted by term extractor module 206 to assign the plurality of annotation tags. In an embodiment, tag annotation module 208 may use a simple text processing approach to assign these annotation tags. By way of an example, in the "Appraisal Process" document, the following sentence is used: "HR can view appraisals of all employees with band below a predefined band." For this sentence, tag annotation module 208 assigns a role annotation tag to "HR" a responsibility annotation tag to "Appraisal," an authority annotation tag to "Viewing Appraisal," and a restriction annotation tag to "band below the predefined band." In case there is any conflict while assigning the plurality of annotation tags, then relationship, order, and context information is also considered to assign annotation tags. By way of an example, in retail verticals, HR is allocated based on geography.

In an embodiment, while assigning the annotation tags, in case of verbs, a further check may be performed to verify, if the label and the "not" auxiliary have been split during the term extraction into two consecutive terms. By way of an example, for terms like "Not displayed," "Not visible," or "Not reporting," if "not" is separated, then meaning of the terms may be reverse of the intended meaning.

Based on the plurality of contextual terms and assigned plurality of annotation tags to each sentence in the enterprise policy documents, access rule generation module 212 generates a plurality of information access rules. The plurality of information access rules may help defining how and when users would be allowed to access information in the enterprise network. By way of an example, an information access rule may be: "HR views appraisal status of employees." By way of another example, an information access rule may be: "Only managers would be issued office laptops."

As and when new input documents are introduced in the enterprise, they are fed into ontology module 204 and tag annotation module 208. As a result, the information access rules are continuously updated and revised in order to be in conformance with the new role definitions and enterprise policies. These information access rules along with the assigned plurality of annotation tags are then used by context similarity tree module 214 to create a context similarity tree model 216 based on the context and semantics. While creating context similarity tree model 216, each sentence that is assigned annotation tags is grouped based on the plurality of contextual terms. By way of an example, context similarity is illustrated in table 3 given below:

TABLE 3

| Context | Description |
| --- | --- |
| Time | A person is restricted to perform assigned task for stipulated period of time. This can be between start dates to end date. Specifically, on some days/dates. |
| Geographical information | A person is restricted to perform assigned task for certain defined regions of the world. For example, APAC or Europe or USA etc. |
| Personal information | The personal information such as person's contract details and current active states he/she is restricted to do some activities in. |
| Role dynamicity | A person may be able to play different roles in different projects or geographical areas etc. |

In continuation of the example above, a context similarity tree model is illustrated in table 4 given below:

TABLE 4

| Role | Process | Operation/Action | Scope of operation |
| --- | --- | --- | --- |
| HR | Appraisal | Appraisal view | Employees of same account |
| | Appraisal | Appraisal update | Employees of same account |
| | Exit Process | Exit Interview | An HR SPOC |
| | Recruitment | Job Description | Manager of the same account |
| | Events | Selection of Venue | Administration head |
| Manager | Leave Approval | Approve leave | Employees under same manager |
| | Leave | Reject Leave | Employees under same |

TABLE 4-continued

| Role | Process | Operation/Action | Scope of operation |
| --- | --- | --- | --- |
| Architect | Rejection Architecture | Architecture Review | manager Architecture of specific domain |
| Engineer | Production Customer Support | Edit Query Ticket view | Supporting Database Tickets from same category |

It will be apparent to a person skilled in the art that the presentation of the context similarity tree model given above is merely for illustrative purpose and other graphical presentations may also be used to depict context similarity tree model 216.

Context similarity tree model 216 is then used by a user access request analyzing module 218 to determine whether a user is authorized to access certain type of information stored in any database of the enterprise. Creation of context similarity tree model 216 is a continuously evolving process, such that, as and when new input documents are introduced in the enterprise, the fields within context similarity tree model 216 are automatically updated. This ensures that users are allowed access to information within the enterprise based on the latest policies defined in the enterprise.

Figure 3:
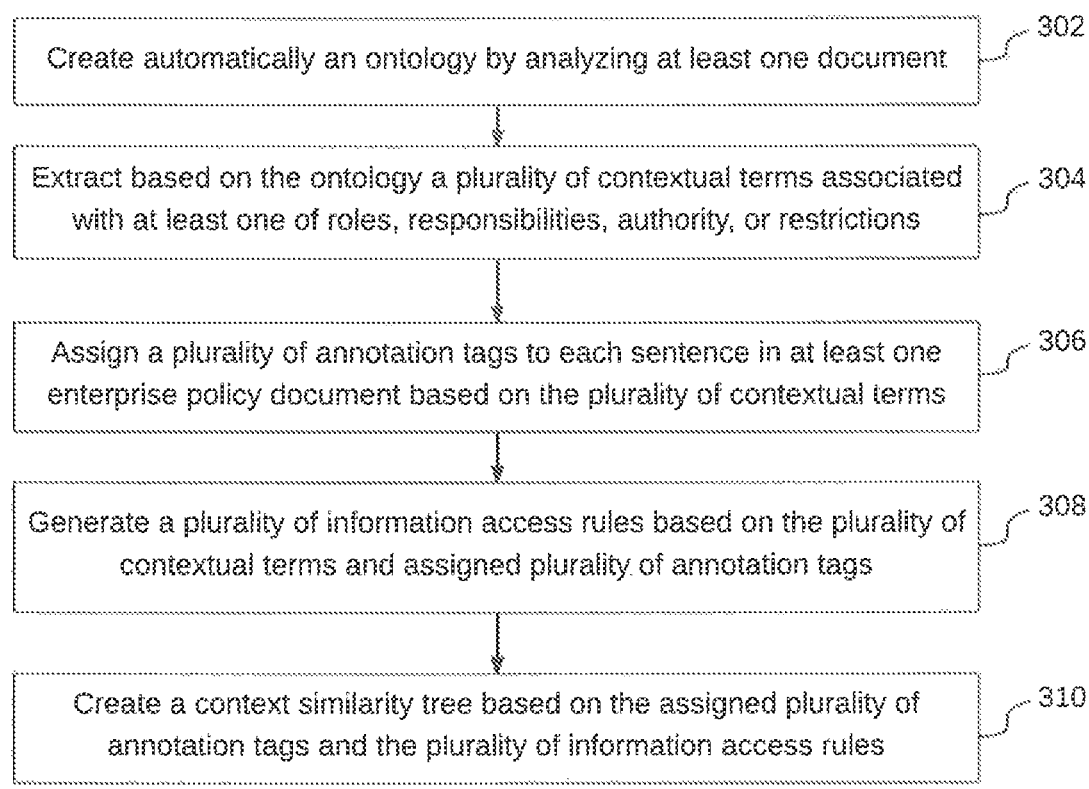
FIG. 3 illustrates a flow chart of a method for creating a context similarity tree to determine user access to information in an enterprise network, in accordance with an embodiment.

Referring now to FIG. 3, a flow chart of a method for creating a context similarity tree to determine user access to information in an enterprise network is illustrated, in accordance with an embodiment. To this end, input documents are first processed by enterprise network device 102. Input documents may be received via UI 122, an application (for example, Adobe Acrobat, BOTs, MS Word, Internet Explorer, etc.), or an external device (for example, a scanner, a fax machine, or a computing device, etc.). In an enterprise, every job role or level would have a predefined role, responsibility, authority, and restrictions associated with it. Thus, when a role based ontology is required to be created, the input documents would include job descriptor documents and security policy documents that have semantic information associated with job descriptions for different roles or employee levels within the enterprise. These documents would thus include detailed information for roles and its responsibilities, authorities, and restrictions associated with a plurality of users in the enterprise. At 302, enterprise network device 102 automatically analyzes these input documents, as and when they are created and fed into the system, and subsequently creates an ontology by extracting semantic information from them. Restrictions associated with a role may be based on time, geography information and personal information. Additionally, restrictions associated with a role may also be based on role dynamicity, which means different roles played by the same person having two different time or geographies or personal information. This has already been explained in detail in conjunction with FIG. 2.

Based on the ontology, at 304, enterprise network device 102 extracts a plurality of contextual terms associated with one or more of roles, responsibilities, authority, or restrictions. These contextual terms after being extracted, may be normalized. However, two contextual terms may co-occur for various reasons, including functional and other relationships. Once the plurality of contextual terms have been extracted from the ontology, relationship amongst these plurality of contextual terms may be determined. In an embodiment, contextual terms that are dependent or other contextual terms or are completely independent of other contextual terms are determined. Each of the plurality of contextual terms may further be categorized into a plurality of categories. These categories may include, but are not limited to mandatory contextual terms, optional contextual terms, conditional contextual terms, value based contextual terms, or discrete terms. This has already been explained in detail in conjunction with FIG. 2.

Thereafter, at 306, enterprise network device 182 assigns a plurality of annotation tags to each sentence in one or more enterprise policy documents based on the plurality of contextual terms. Input policy documents may be enterprise policy documents, and examples of these documents may include, but are not limited to appraisal process document, a recruitment process document, and a general security process document. Each of the plurality of annotation tags correspond to one or more of roles, responsibilities, authority, and restrictions. This has already been explained in detail in conjunction with FIG. 2.

Based on the plurality of contextual terms and assigned plurality of annotation tags to each sentence in the enterprise policy documents, enterprise network device 102, at 308, generates a plurality of information access rules. The plurality of information access rules would help defining how and when users would be allowed to access information in the enterprise network. As and when new enterprise policy documents are introduced in the enterprise, the information access rules are automatically updated and revised in order to be in conformance with the new role definitions and enterprise policies.

Thereafter, at 310, enterprise network device 102 creates a context similarity tree based on the assigned plurality of annotation tags and the plurality of information access rules. While creating context similarity tree model 216, each sentence that is assigned annotation tags is grouped based on the plurality of contextual terms. This has already been explained in detail in conjunction with FIG. 2. The context similarity tree is then used by enterprise network device 102 to determine whether a user is authorized to access certain type of information stored in any database of the enterprise. This is further explained in conjunction with FIG. 4.

Figure 4:
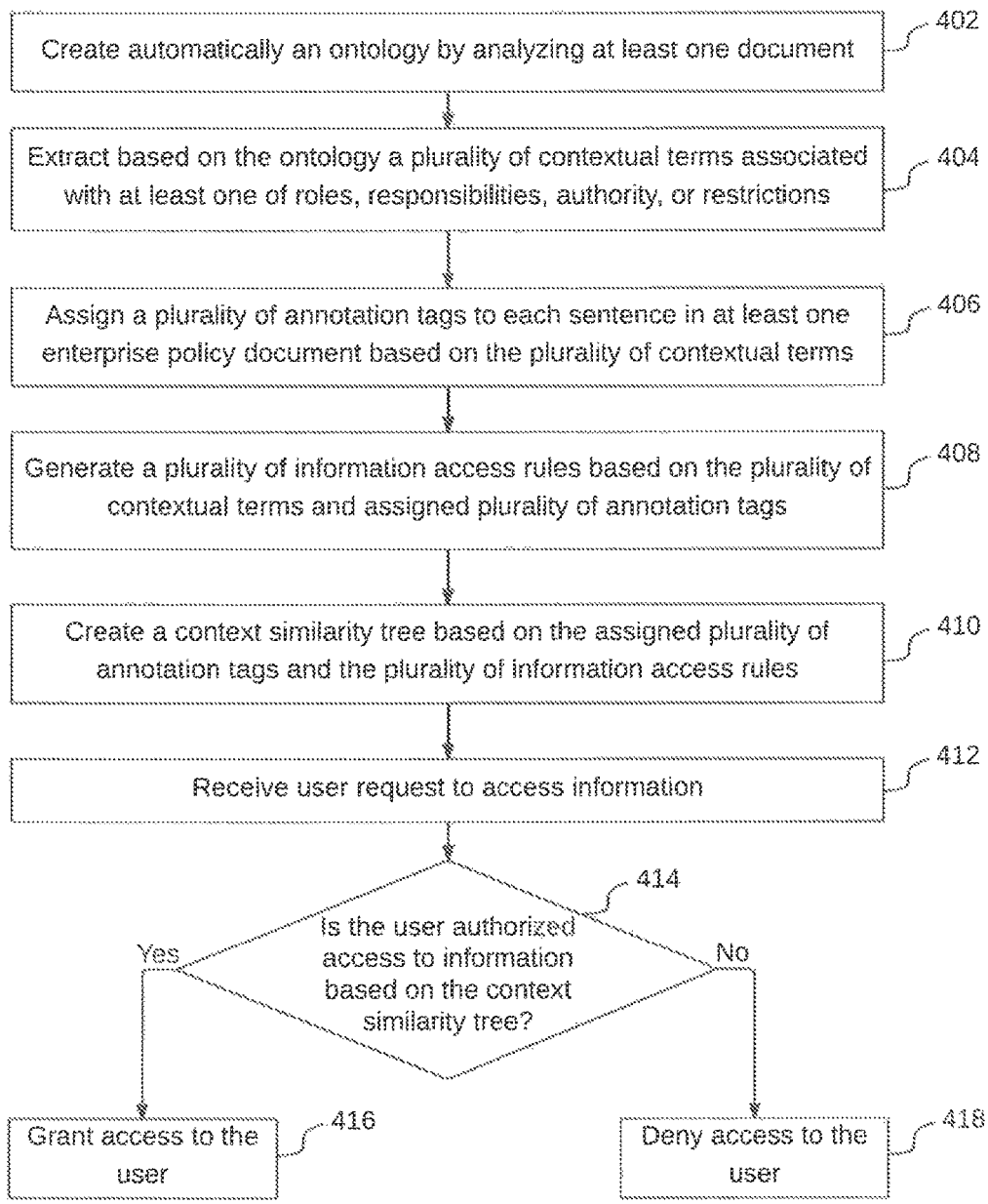
FIG. 4 illustrate a flow chart of a method for providing information access to a user in an enterprise network, in accordance with an embodiment.

Referring now to FIG. 4, a flow chart of a method for providing information access to a user in an enterprise network is illustrated, in accordance with another embodiment. At 402, an ontology tree is automatically created by analyzing one or more documents that include semantic information for roles, responsibilities, authority, and restrictions associated with a plurality of users. At 404, based on the ontology, a plurality of contextual terms associated with one or more of roles, responsibilities, authority, or restrictions are extracted. At 406, a plurality of annotation tags are assigned to each sentence in one or more enterprise policy documents based on the plurality of contextual terms. Each of the plurality of annotation tags correspond to one or more of roles, responsibilities, authority, and restrictions. At 408, a plurality of information access rules are generated based on the plurality of contextual terms and assigned plurality of annotation tags to each sentence in the one or more enterprise policy documents. At 410, a context similarity tree is created based on the assigned plurality of annotation tags and the plurality of information access rules. This has been explained in detail in conjunction with FIG. 2 and FIG. 3.

Thereafter, at 412, a user request to access information in the enterprise network is received by enterprise network device 102. In response to the user request, enterprise network device 102 accesses the context similarity tree created at 410 and perform a check, at 414, to determine whether the user is authorized to access the requested information. If the user is authorized to access the requested information, enterprise network device 102, at 416, grants access to the user. As a result, the user is able to access the requested information. However, if the user is not authorized to access the requested information, enterprise network device 102, at 418, denies access to the user. As a result, the user is not able to access the requested information. By way of an example and referring back to table 4, a user from a particular account may request to "view appraisal." As the scope of operation in this case is defined in table 4 as: "Employees of same account," the user may be granted access only when he/she belongs to the same account.

Figure 5:
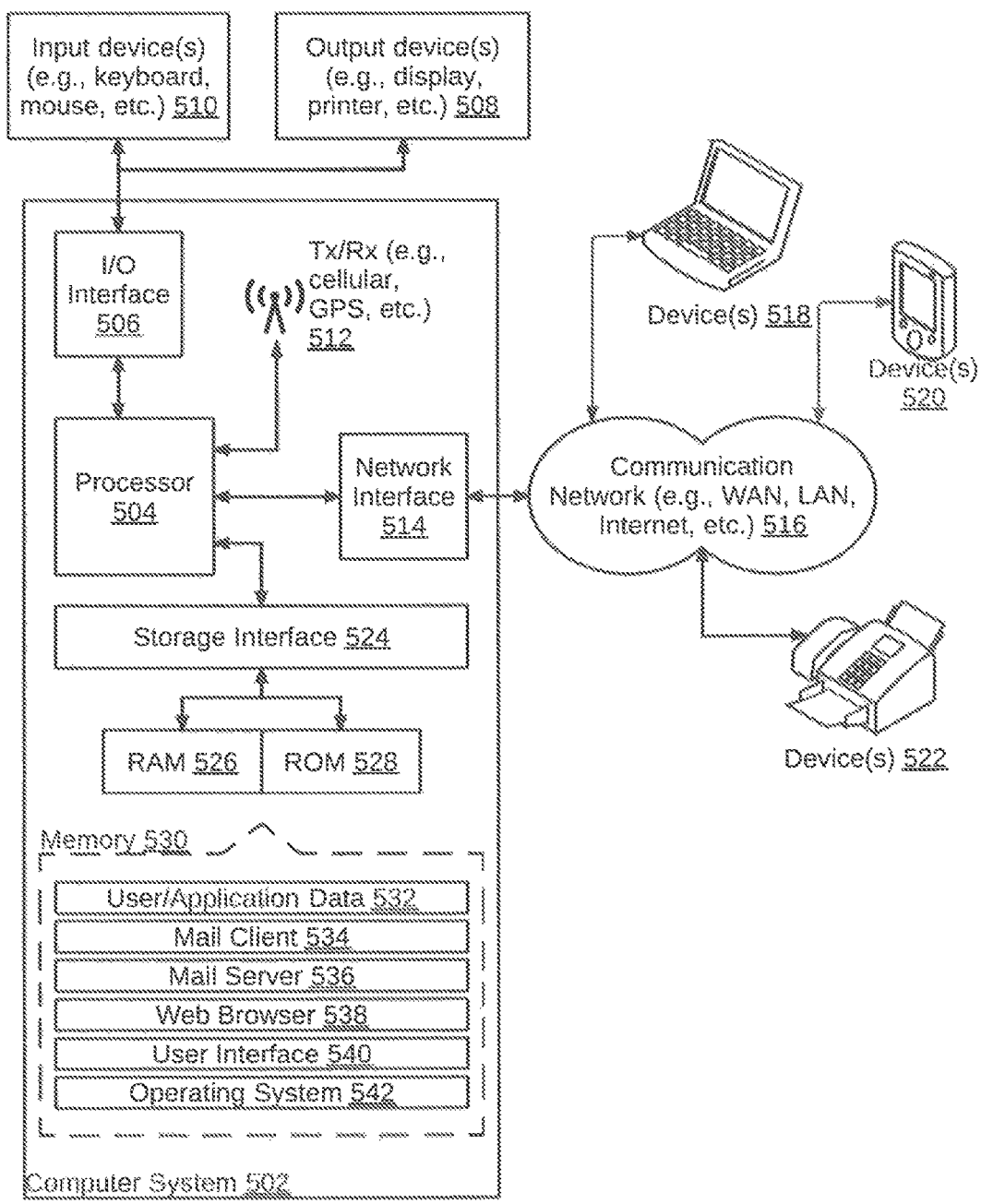
FIG. 5 illustrates a block diagram of an exemplary computer system for implementing various embodiments.

FIG. 5 is a block diagram of an exemplary computer system for implementing various embodiments. Computer system 502 may comprise a central processing unit ("CPU" or "processor") 504. Processor 504 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 502 may itself embody one or more of these devices.

In some embodiments, processor 504 may be disposed in communication with one or more memory devices (e.g., RAM 525, ROM 528, etc.) via a storage interface 524. Storage interface 524 may connect to memory devices 530 including, without limitation, memory drives, removable disc drives, etc., employing connection protocols such as serial advanced technology attachment (BATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 530 may store a collection of program or database components, including, without limitation, an operating system 532, a user interface application 534, a web browser 536, a mail server 538, a mail client 540, a user/application data 542 (e.g., any data variables or data records discussed in this disclosure), etc. Operating system 532 may facilitate resource management and operation of the computer system 502. Examples of operating system 532 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e,g., Aero, Metro, etc.), Unix X-Windows, web interface libraries (e.g., ActiveX, Java, Javascript, AJAX, HTML, Adobe Flash, etc.), or the like.

In some embodiments, computer system 502 may implement web browser 536 stored program component. Web browser 536 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 502 may implement mail server 538 stored program component. Mail server 538 may be an Internet mail server such as Microsoft Exchange, or the like. The mail server may utilize facilities such as ASP, ActiveX, ANSI C++/C#, Microsoft, NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement mail client 540 stored program component. Mail client 540 may be a mail viewing application, such as Apple Mail, Microsoft Entourage, Microsoft Outlook, Mozilla Thunderbird, etc.

In some embodiments, computer system 502 may store user/application data 542, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g. XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide methods and system for controlling user access to information in enterprise networks. These methods and systems enable efficient management of access to information in an enterprise without requiring a centralized authority. Moreover, the access management is multiple context based, i.e., time, geography, role, responsibility, and restrictions etc. Additionally, creation of context similarity tree is a continuously evolving process, such that, as and when new input documents are introduced in the enterprise, the fields within context similarity tree are automatically updated. This ensures that users are allowed access to information within the enterprise based on the latest policies defined in the enterprise. The system thus allows users to efficiently manage read and write access to linked data without a centralized authority.

The specification has described methods and system for controlling user access to information in enterprise networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing information access in an enterprise network, the method comprising:
creating automatically, by an enterprise network device, an ontology by analyzing at least one document comprising semantic information for roles, responsibilities, authority, and restrictions associated with a plurality of users;
extracting based on the ontology, by the enterprise network device, a plurality of contextual terms associated with at least one of roles, responsibilities, authority, or restrictions;
assigning, by the enterprise network device, a plurality of annotation tags to each sentence in at least one enterprise policy document based on the plurality of contextual terms, wherein each of the plurality of annotation tags corresponding to at least one of roles, responsibilities, authority, and restrictions;
generating, by the enterprise network device, a plurality of information access rules based on the plurality of contextual terms and assigned plurality of annotation tags to each sentence in the at least one enterprise policy document; and
creating, by the enterprise network device, a context similarity tree based on the assigned plurality of annotation tags and the plurality of information access rules, wherein the at least one enterprise policy document comprises natural language sentences, and wherein the natural language sentences are parsed using natural language processing engine.

2. The method of claim 1, wherein a restriction for a role is determined based on at least one of time, geography information, personal information, or a dynamicity associated with the role.

3. The method of claim 1 further comprising determining relationship amongst the plurality of contextual terms.

4. The method of claim 1 further comprising categorizing each of the plurality of contextual terms into a plurality of categories.

5. The method of claim 1 further comprising normalizing each of the plurality of contextual terms.

6. The method of claim 1, wherein assigning comprises matching a lemmatized version of each of the plurality of contextual terms with words in each sentence in the at least one enterprise policy document.

7. The method of claim 1, wherein creating the context similarity tree comprises grouping each sentence that is assigned annotation tags, based on the plurality of contextual terms.

8. The method of claim 1 further comprising determining, based on the context similarity tree, whether a user is authorized to access a particular information in the enterprise network.

9. An enterprise network device for providing information access in an enterprise network, the enterprise network device comprising:
a processor; and
a memory communicatively coupled to the processor, wherein the memory stores processor instructions, which, on execution, causes the processor to:
create automatically an ontology by analyzing at least one document comprising semantic information for roles, responsibilities, authority, and restrictions associated with a plurality of users;
extract based on the ontology a plurality of contextual terms associated with at least one of roles, responsibilities, authority, or restrictions;
assign a plurality of annotation tags to each sentence in at least one enterprise policy document based on the plurality of contextual terms, wherein each of the plurality of annotation tags corresponding to at least one of roles, responsibilities, authority, and restrictions;
generate a plurality of information access rules based on the plurality of contextual terms and assigned plurality of annotation tags to each sentence in the at least one enterprise policy document; and
create a context similarity tree based on the assigned plurality of annotation tags and the plurality of information access rules,
wherein the at least one enterprise policy document comprises natural language sentences, and wherein the natural language sentences are parsed using natural language processing engine.

10. The enterprise network device of claim 9, wherein a restriction for a role is determined based on at least one of time, geography information, personal information, or a dynamicity associated with the role.

11. The enterprise network device of claim 9, wherein the processor is further configured to determine relationship amongst the plurality of contextual terms.

12. The enterprise network device of claim 9, wherein the processor is further configured to categorize each of the plurality of contextual terms into a plurality of categories.

13. The enterprise network device of claim 9, wherein the processor is further configured to normalize each of the plurality of contextual terms.

14. The enterprise network device of claim 9, wherein the processor is further configured to match a lemmatized version of each of the plurality of contextual terms with words in each sentence in the at least one enterprise policy document.

15. The enterprise network device of claim 9, wherein the processor is further configured to group each sentence that is assigned annotation tags, based on the plurality of contextual terms.

16. The enterprise network device of claim 9, wherein the processor is further configured to determine based on the context similarity tree, whether a user is authorized to access a particular information in the enterprise network.

17. A non-transitory computer-readable storage medium having stored thereon, a set of computer-executable instructions for providing information access in an enterprise network, causing a computer comprising one or more processors to perform steps comprising:
creating automatically, by an enterprise network device, an ontology by analyzing at least one document comprising semantic information for roles, responsibilities, authority, and restrictions associated with a plurality of users;
extracting based on the ontology, by the enterprise network device, a plurality of contextual terms associated with at least one of roles, responsibilities, authority, or restrictions;
assigning, by the enterprise network device, a plurality of annotation tags to each sentence in at least one enterprise policy document based on the plurality of contextual terms, wherein each of the plurality of annotation tags corresponding to at least one of roles, responsibilities, authority, and restrictions;
generating, by the enterprise network device, a plurality of information access rules based on the plurality of contextual terms and assigned plurality of annotation tags to each sentence in the at least one enterprise policy document; and
creating, by the enterprise network device, a context similarity tree based on the assigned plurality of annotation tags and the plurality of information access rules,
wherein the at least one enterprise policy document comprises natural language sentences, and wherein the natural language sentences are parsed using natural language processing engine.

* * * * *